United States Patent
Lee et al.

(10) Patent No.: US 7,145,614 B2
(45) Date of Patent: Dec. 5, 2006

(54) REFLECTIVE DISPLAY DEVICE USING PHOTONIC CRYSTALS

(75) Inventors: Hong-seok Lee, Sungnam (KR); Suk-han Lee, Youngin (KR); Ji-deog Kim, Seoul (KR); Il-kwon Moon, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 113 days.

(21) Appl. No.: 10/413,589

(22) Filed: Apr. 15, 2003

(65) Prior Publication Data

US 2003/0218704 A1   Nov. 27, 2003

(30) Foreign Application Priority Data

Apr. 30, 2002   (KR) ................. 2002-23575

(51) Int. Cl.
*G02F 1/1335* (2006.01)

(52) U.S. Cl. ..................................... 349/106
(58) Field of Classification Search ............. 349/106, 349/113, 115; 359/599, 587; 428/577
See application file for complete search history.

(56) References Cited

U.S. PATENT DOCUMENTS

| | | | |
|---|---|---|---|
| 5,131,736 A * | 7/1992 | Alvarez ..................... | 359/886 |
| 5,281,370 A | 1/1994 | Asher et al. | |
| 5,729,313 A * | 3/1998 | Mitsui ........................ | 349/106 |
| 5,837,333 A | 11/1998 | Nagayama et al. | |
| 6,593,981 B1 * | 7/2003 | Haim et al. .................. | 349/106 |
| 6,768,531 B1 * | 7/2004 | Ochiai et al. ................ | 349/141 |
| 6,863,847 B1 * | 3/2005 | Fu et al. ..................... | 364/1.21 |

FOREIGN PATENT DOCUMENTS

| | | |
|---|---|---|
| JP | 07-043527 | 2/1995 |
| JP | 08-234007 | 9/1996 |
| JP | 10-282324 | 10/1998 |
| JP | 2001-147407 | 5/2001 |
| WO | WO 00/77566 A1 | 12/2000 |

OTHER PUBLICATIONS

Johnson, et al.* Synth. Met. (Switzerland), Synthetic Metals, vol. 116, No. 1-3, pp. 469-473.
*Entitled: "Synthesis and optical properties of opal and inverse opal photonic crystals".
Wu, et al., ** Asia Display '95, Oct. 16, 1995, pp. 929-930, XP002148248.
**Entitled: "Design of a Reflective Color LCD Using Optical Interference Reflectors".

* cited by examiner

*Primary Examiner*—Andrew Schechter
*Assistant Examiner*—Richard H Kim
(74) *Attorney, Agent, or Firm*—Lee & Morse, P.C.

(57) ABSTRACT

A reflective display device using photonic crystals includes a plurality of reflective color filters, each reflective color filter reflects a predetermined wavelength range of an incident visible light; and a plurality of optical switches disposed adjacent to and facing a corresponding one of the plurality of reflective color filters, each of the plurality of optical switches extracts a predetermined color by adjusting an intensity or on/off-frequency of light reflected from the corresponding one of the plurality of reflective color filters. Accordingly, a reflective display device using photonic crystals may have a simplified structure requiring no conventional reflecting mirror.

3 Claims, 2 Drawing Sheets

REFLECTIVE DISPLAY DEVICE USING PHOTONIC CRYSTALS

BACKGROUND OF THE INVENTION

1. Field of the Invention

The present invention relates to a reflective display device. More particularly, the present invention relates to a reflective display device using photonic crystals that improves the optical efficiency due to the selective reflection and high reflectivity of photonic crystal structures.

2. Description of the Related Art

A display device of a portable device, such as a mobile phone or a personal digital assistant (PDA), uses a reflective color display to project an image using the reflection of the surrounding light. Accordingly, there is no need for backlight in such a reflective color display, thereby making the portable device lightweight, thin, and less power consumptive.

In order to make a desired color, such reflective display devices use color filters. Therefore, the efficiency of the color filter is critical to obtaining a vivid display. A color filter produces a desired color by passing light of a particular wavelength and by absorbing light of other wavelengths. The color filter significantly affects the efficiency of the reflective display devices, since it passes only a portion of the incident white light.

FIG. 1 illustrates a sectional view of a conventional reflective display device.

The reflective display device in FIG. 1 includes a transmission type color filter 11, an optical switch 12, and a reflecting mirror 13. The optical switch 12 includes two polarizers 121, 123 and a liquid crystal layer 122 disposed between the polarizers 121, 123.

In the conventional reflective display device of FIG. 1, incident light enters the device by passing through the transmission type color filter 11, is then adjusted by the optical switch 12, is then reflected by the reflecting mirror 13, and then exits the device by passing through the transmission type color filter 11 a second time.

Such a conventional reflective display device has a problem in that light efficiency is reduced as the light passes through the transmission type color filter 11 twice, both upon entering and exiting the device. In addition, it is also problematic that the luminance and contrast are low, and the hue and brightness are not vivid.

SUMMARY OF THE INVENTION

In an effort to solve the above problems, it is a feature of an embodiment of the present invention to provide a reflective display device using photonic crystals as a reflective color filter that has a high reflection efficiency and a simplified structure.

In order to provide the above feature, a reflective display device using photonic crystals includes a plurality of reflective color filters, each reflective color filter reflects a predetermined wavelength range of an incident visible light; and a plurality of optical switches disposed adjacent to and facing a corresponding one of the plurality of reflective color filters, each of the plurality of optical switches extracts a predetermined color by adjusting an intensity of on/off-frequency of light reflected from the corresponding one of the plurality of reflective color filters.

The plurality of reflective color filters are preferably three (3) reflective color filters, each one corresponding to a color, red (R), green (G), or blue (B). The plurality of optical switches are preferably three (3) optical switches, each one corresponding to a color, red (R), green (G), or blue (B).

Preferably, each of the plurality of reflective color filters include photonic crystals having a periodic arrangement of dielectrics. Also preferably, each of the plurality of reflective color filters comprise photonic crystals having a band gap that reflects one range of light wavelengths corresponding to a color selected from the group consisting of red (R), green (G), and blue (B). The photonic crystals of the plurality of reflective color filters may be three-dimensional photonic crystals of inverse opal structure having colloids of varying sizes. Preferably, the colloids are spheres having diameters of several hundred of nanometers and repeatedly arranged in at least ten (10) layers to form a sufficient band gap. Preferably, the colloids of the red (R) reflective color filter have the largest size to reflect the light of the longest wavelength among red (R), green (G), and blue (B).

The reflective display device using photonic crystals may use a liquid crystal (LC) for each of the plurality of optical switches.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Figure 1:
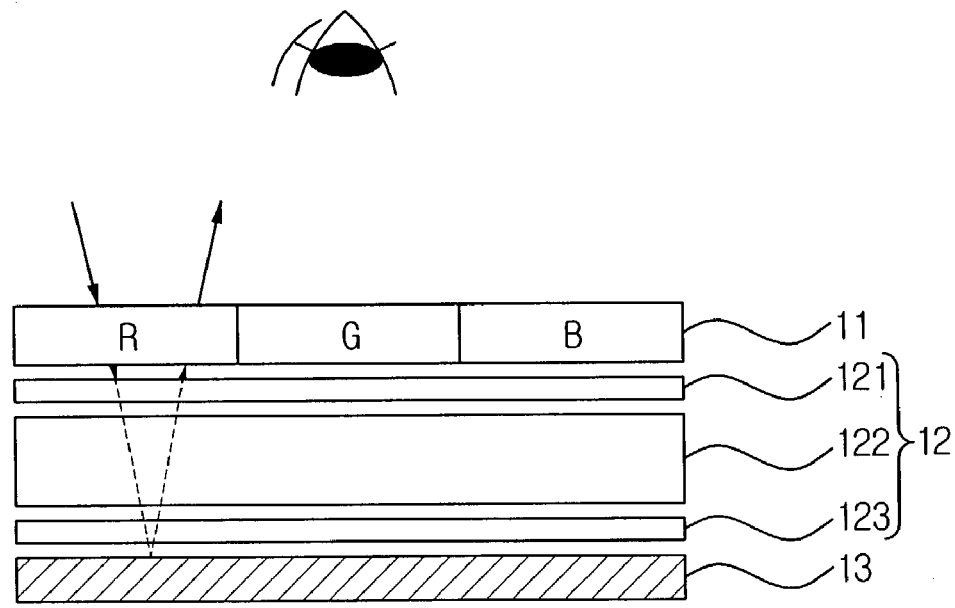
FIG. 1 illustrates a sectional view of a conventional reflective display device.

Korean Patent Application No. 2002-23575, filed on Apr. 30, 2002, and entitled: "Reflective Display Device Using Photonic Crystals," is incorporated by reference herein in its entirety.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Figure 2:
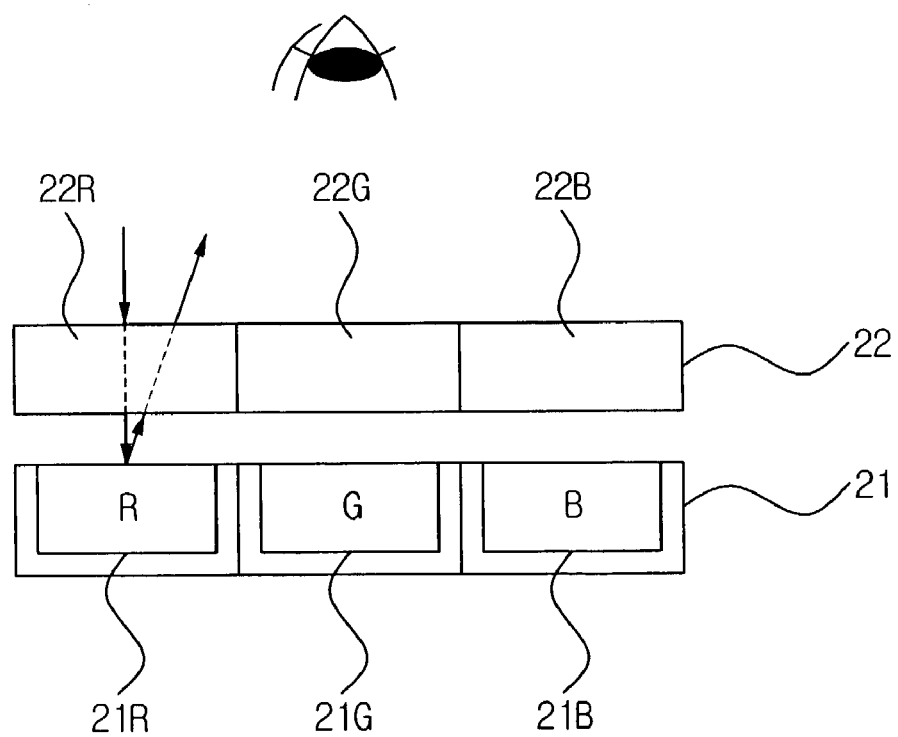
FIG. 2 illustrates a sectional view of a reflective display device according to an embodiment of the present invention.

FIG. 2 illustrates a sectional view of a reflective display device according to an embodiment of the present invention.

As shown in FIG. 2, a reflective display device includes a reflective color filter 21 and an optical switch 22 for adjusting the intensity or on/off-frequency of light reflected from the reflective color filter 21. The reflective color filter 21 preferably includes three (3) reflective color filters 21R, 21G, and 21B, for reflecting red, green, and blue light, respectively. The optical switch 22 preferably includes three (3) optical switches 22R, 22G, 22B for creating a desired color by adjusting an amount of red (R), green (G) and blue (B) light reflected from a corresponding reflective color filter 21R, 21G, or 21B, respectively. A liquid crystal (LC), for example, may be used as each of the optical switches 22R, 22G, 22B. A more detailed description of the optical switch 22 will be omitted as the structure and operation thereof is relatively well-known to those of ordinary skill in the art.

Each optical switch 22R, 22G, 22B is disposed adjacent to and facing the corresponding one of the three reflective color filters 21R, 21G, 21B respectively. Each of the reflective color filters include photonic crystals having a periodic arrangement of dielectrics. Photonic crystals are fabricated by introducing a suitable variation of refractive index in two or three dimensions. Each reflective color filter 21R, 21G, or 21B reflects a desired wavelength range of the light and passes the rest of the range since it has a different photonic band gap (PBG) according to the characteristics of the photonic crystals.

When the photonic crystals are fabricated, the width and location of the photonic band gap varies depending on the parameters of the photonic crystals, such as refractive index used, the geometry of the periodical structure, the periods of index variation, and the like. For example, in a two-dimensional case, photonic crystals are fabricated by making periodically arranged cylinders in air or holes in a dielectric substrate. Recently, photonic crystals have been fabricated by hologram lithography or a self-assembly method using colloids of several hundred nanometers in diameter.

Figure 3:
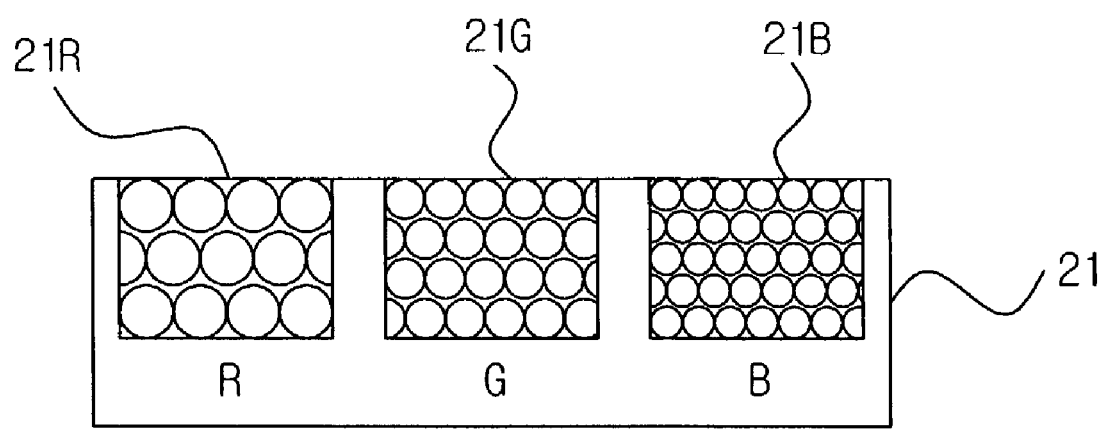
FIG. 3 is a drawing of a reflective color filter according to an embodiment of the present invention realized using three-dimensional photonic crystals of inverse opal structure having colloids of varying sizes.

FIG. 3 is a drawing of a reflective color filter according to an embodiment of the present invention realized using three-dimensional photonic crystals of inverse opal structure having colloids of varying sizes.

Colloids are spheres of several hundred nanometers in diameter and repeatedly arranged in at least ten (10) layers to form a sufficient band gap.

As shown in FIG. 3, the colloids of the R color filter 21R have the largest size to reflect the light of the longest wavelength among R, G and B. Such implementation of the color filter using colloids, however, is only one possible embodiment of the present invention. If photonic crystals are used as the reflective color filters, the efficiency and contrast may be improved by over 90% as compared to a conventional transmission type color filter due to the high reflectivity of photonic crystals. In addition, the viewing angle may be widened because the three-dimensional photonic crystals may have band gaps to all incident directions.

Hereinafter, a propagation of incident light is described with reference to FIG. 2.

In FIG. 2, when a white light enters the reflective color filter 21 after passing through the optical switch 22, the light in a wavelength range corresponding to each R, G or B color filter 21R, 21G or 21B are selectively reflected, and then the reflected light passes through the corresponding optical switch 22R, 22G or 22B again. The amount of reflected lights may be adjusted by the optical switch 22, and the desired color may be realized as a mixture of the RGB light.

According to the present invention, efficiency can be improved because the incident light is reflected only once through the color filter, while the conventional art needs to pass through the transmission type color filter twice. In addition, a reflective display device using photonic crystals according to an embodiment of the present invention has a simplified structure that requires no reflecting mirror.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A reflective display device using photonic crystals, comprising:
    a plurality of reflective color filters, each reflective color filter reflects a predetermined wavelength range of an incident visible light, each of the plurality of reflective color filters including three-dimensional photonic crystals of inverse opal structure having colloids of varying sizes; and
    a plurality of optical switches disposed adjacent to and facing a corresponding one of the plurality of reflective color filters, each of the plurality of optical switches extracts a predetermined color by adjusting an intensity or on/off-frequency of light reflected from the corresponding one of the plurality of reflective color filters.

2. The reflective display device using photonic crystals as claimed in claim 1, wherein the colloids are spheres having diameters of several hundred of nanometers and repeatedly arranged in at least ten (10) layers to form a sufficient band gap.

3. The reflective display device using photonic crystals as claimed in claim 1, wherein the colloids of the red (R) reflective color filter have the largest size to reflect the light of the longest wavelength among red (R), green (G), and blue (B).

* * * * *